(12) United States Patent
Stewart et al.

(10) Patent No.: US 7,381,125 B2
(45) Date of Patent: Jun. 3, 2008

(54) TENDERIZING DEVICE

(75) Inventors: Anna M. Stewart, Atlanta, GA (US); Stephen Kraigh Stewart, Atlanta, GA (US)

(73) Assignee: Fusion Brands Incorporated, Atlanta, GA (US)

( * ) Notice: Subject to any disclaimer, the term of this patent is extended or adjusted under 35 U.S.C. 154(b) by 0 days.

(21) Appl. No.: 11/530,762

(22) Filed: Sep. 11, 2006

(65) Prior Publication Data
US 2007/0254578 A1   Nov. 1, 2007

Related U.S. Application Data

(63) Continuation-in-part of application No. 29/255,631, filed on Mar. 11, 2006, now Pat. No. Des. 550,523.

(51) Int. Cl.
*A22C 9/00*  (2006.01)

(52) U.S. Cl. .................................... 452/141

(58) Field of Classification Search ............... 452/6, 452/141–145; 7/110–113; 492/13, 14, 16, 492/19, 27, 28, 30, 31, 33–36; 172/21, 118–122, 172/174, 176, 177, 187, 240, 518, 542, 548, 172/556
See application file for complete search history.

(56) References Cited

U.S. PATENT DOCUMENTS

| | | | |
|---|---|---|---|
| 276,640 A * | 5/1883 | Spencer | |
| 278,258 A * | 5/1883 | Nath | 492/14 |
| 2,937,377 A | 5/1960 | Mackay | |
| 4,068,620 A * | 1/1978 | Peters | |
| 4,107,830 A * | 8/1978 | Thomson | 492/14 |
| 4,291,438 A * | 9/1981 | Seiki et al. | 19/112 |
| 4,566,162 A * | 1/1986 | Brands | 26/105 |
| 4,718,769 A * | 1/1988 | Conkey | 366/69 |
| 4,815,859 A * | 3/1989 | Weinkle | 366/69 |
| 5,129,876 A * | 7/1992 | Brabant et al. | 493/471 |
| D368,330 S | 3/1996 | Robinson | |
| D425,261 S | 5/2000 | Basile | |
| 6,131,977 A | 10/2000 | Sacks et al. | |
| 6,145,128 A | 11/2000 | Suzuki | |
| 6,305,023 B1 | 10/2001 | Barkes | |
| 6,481,471 B1 * | 11/2002 | Johnson et al. | 144/246.1 |
| 6,532,597 B2 | 3/2003 | Bignon et al. | |
| D477,690 S | 7/2003 | Howell et al. | |
| D488,887 S | 4/2004 | Bignon et al. | |
| D491,317 S | 6/2004 | Bignon et al. | |
| D491,318 S | 6/2004 | Bignon et al. | |
| D500,177 S | 12/2004 | Wu | |
| D504,544 S | 4/2005 | Lee | |
| D506,291 S | 6/2005 | Lee | |
| 7,052,450 B2 * | 5/2006 | Dua et al. | 492/14 |
| D526,096 S | 8/2006 | Kaposi | |

* cited by examiner

*Primary Examiner*—Thomas Price
(74) *Attorney, Agent, or Firm*—George Ronald Reardon

(57) ABSTRACT

A device that facilitates the simultaneous tenderizing and flattening of meat is provided. The device uses a modified rolling pin like structure and has a meat preparation central section between two opposing handles. The meat preparation area has a greater circumference in the middle which decreases where the meat preparation area meets each handle. The meat preparation area consists of alternating bands of a tenderizing element and a flattening element arranged in a non-linear fashion. Each tenderizing element consists of an array of serrations of varying sizes.

7 Claims, 4 Drawing Sheets

TENDERIZING DEVICE

This application claims the benefit of the filing date of and is a continuation-in-part of United States Design Patent Application having a title of TENDERIZING DEVICE, filed on Mar. 11, 2006 and assigned Ser. No. 29/255,631.

FIELD OF THE INVENTION

The present invention relates to the field of kitchen utensils, and more particularly to devices for tenderizing a food item.

BACKGROUND OF THE INVENTION

It is well known in the art that tenderized meat tastes better, cooks easier and faster, and absorbs seasonings and aromatic spices better than meat that is not tenderized. A particular portion of meat may be tender or tough depending on the species of the animal slaughtered, its breed, its health, its feed, the amount of exercise it got, whether it was fed at a feed lot before slaughter, and a variety of other factors. People tend to prefer tender meat because it is easier to eat, easier to digest, and tends to be more flavorful.

Various devices and methods for tenderizing meat are also well known in the art. Pounding meat with meat tenderizing mallets is the most common means of tenderizing meat, but has the drawbacks of destroying the texture of the meat, and causing a great mess through splattered meat particles.

Chemical tenderizers, e.g. Mono Sodium Glutamate (MSG), are used to tenderize meats but these have the drawbacks of frequently changing the flavor of the meat, and generating potential health risks to some people.

The invention solves the problem of having the control at your fingertips for applying a controlled amount of pressure to a piece of meat so to gently tenderize and flatten meat without tearing. Tearing is a problem especially, when working with more delicate cuts of meat like veal, chicken, pork and the like.

Other methods of tenderizing meat include marinating, aging, and the like, but these methods require extra time to be fully effective and can change the texture and flavor of the meat being treated.

Known art related to a meat tenderizing device includes the following.

U.S. Pat. No. 7,735, issued to Stagg on Oct. 22, 1850 discloses a hand cranked meat tenderizer.

U.S. Pat. No. 150,893, issued to Robbins et al. on May 12, 1874 discloses a two-handed roller meat tenderizer.

U.S. Pat. No. 443,482, issued to Ginter on Mar. 17, 1891 discloses a one-handed roller meat tenderizer.

U.S. Pat. No. 725,840, issued to Hastings on Apr. 21, 1903 discloses a two-handed roller for cutting and tenderizing beefsteak.

U.S. Pat. No. 866,106, issued to Baker on Sep. 17, 1907 discloses a one-handed meat tenderizer.

U.S. Pat. No. 2,694,221, issued to Dura on Nov. 16, 1954 discloses a two-handed meat tenderizer.

U.S. Pat. No. 3,138,823, issued to Langner on Jun. 30, 1964 discloses a one-handed meat tenderizer device.

U.S. Pat. No. D253,155, issued to Jurida on Oct. 16, 1979 illustrates a one-handed meat tenderizer.

U.S. Pat. No. 5,454,753, issued to Marchese on Oct. 3, 1995 discloses a modular food processing assembly of the present invention includes a rigid support frame, and two elongated horizontally oriented generally cylindrical rollers being rotatably supported by the frame. The rollers may be provided with a plurality of serrated teeth distributed radially and axially about the surface of the rollers, and the rollers are oriented generally parallel to each other. A hand crank is frictionally and removably connected to an end of a roller. Unified translation and compression means connect the rollers proximate the ends of the rollers translating rotation of the hand crank into rotation of the two rollers and further causing the rollers to be compressed against the food being processed. A clamp assembly is also included which is adapted to secure the frame to a fixed base, whereby when the hand crank is rotated, the food passes through the rotating rollers and becomes processed.

U.S. Pat. No. D365,971, issued to Brockmann on Jan. 9, 1996 illustrates a two-handed roller meat tenderizer.

U.S. Pat. No. D401,815, issued to Filipovic on Dec. 1, 1998 illustrates a one-handed meat tenderizing roller.

U.S. Pat. No. D423,888, issued to Kaposi on May 2, 2000 illustrates a meat tenderizer head for a one-handed held mallet tenderizer.

U.S. Pat. No. 6,159,090, issued to Thompson on Dec. 12, 2000 discloses a two-handed roller apparatus used to tenderize meats and poultry products.

U.S. Pat. No. D481,268 S, issued to Hibbert et al. on Oct. 28, 2003 illustrates a one-handed meat tenderizer with spiked roller and marinate dispensing handle.

While these devices fulfill their respective, particular objectives and requirements, the aforementioned patents do not utilize or disclose a tenderizing device having alternating non-linear arrays of serrations and flattening elements on two opposing graduated handles where the serrations vary in size.

A need exists for an apparatus and a method of tenderizing meats that is safer than a mallet, provides for a quick and efficient tenderization of the meats such that it will not shred or otherwise harm the meat, and allows for a more sanitary way to tenderize meats.

Therefore, a need exists for a tenderizing device with these attributes and functionalities. The tenderizing device according to embodiments of the invention substantially departs from the conventional concepts and designs of the prior art. It can be appreciated that there exists a continuing need for a new and improved tenderizing device which can be used commercially. In this regard, the present invention substantially fulfills these objectives.

The foregoing patent and other information reflect the state of the art of which the inventors are aware and are tendered with a view toward discharging the inventors' acknowledged duty of candor in disclosing information that may be pertinent to the patentability of the present invention. It is respectfully stipulated, however, that the foregoing patent and other information do not teach or render obvious, singly or when considered in combination, the inventors' claimed invention.

BRIEF SUMMARY OF THE INVENTION

The general purpose of the present invention, which will be described subsequently in greater detail, is to provide a device that both tenderizes and flattens meat.

The present invention is designed to roll meat by hand similar to the process of rolling out dough with a rolling pin. The present invention is used by rolling back and forth over meats, e.g., beef, chicken, veal, turkey, lamb and the like, to flatten and tenderize simultaneously. The mid-section of the rolling pin has protruding surfaces, e.g., serrations and bars, which perform the tenderizing and the flattening functions on the meat. This mid-section is adjacent to a handle on the left and a handle on the right.

The taper on the body of the device allows a user to decrease or increase a tenderizing and flattening effect upon the meat. This is accomplished by angling the device as it is rolled back and forth giving a varying tenderizing and pressing effect. Holding the device parallel to the table surface as it is rolled back and forth over meat give the maximum depth of penetration. Further control over tenderizing and flattening effect is achieved by a user by applying more or less pressure as the device is being rolled on the meat. The simplicity of the design of the device makes for easy cleaning in the dishwasher since there are no complicated moving parts or hard to clean deep crevices where food can get trapped.

In an exemplary embodiment the present invention is comprised of a one piece structure which has two rolling-pin-like handles with a meat preparation area between the two handles.

The meat preparation area has a greater circumference in the middle which decreases where the meat preparation area meets each handle. The meat preparation area has alternating bands of a tenderizing element and a flattening element arranged in a non-linear fashion. Each tenderizing element consists of an array of serrations, with the largest serrations being located approximately at the center of the surface of meat preparation area and the smallest serrations being located closest to where the meat preparation area and the rolling-pin-like handles meet. These serrations incrementally decrease in size as the array progresses from the center to the edge of the meat preparation area. Each serration may be formed in a pyramidal like shape, but other shapes may be used.

Each flattening element consists of a raised edge for facilitating the flattening of meat.

The two rolling-pin-like handles are formed to taper away from the meat preparation area.

One aspect of the present invention is that it may be used to tenderize and flatten meat simultaneously.

Another aspect of the present invention is that it facilitates applying varying pressure and penetration to meats.

Another aspect of the present invention is that it is dishwasher safe and easy to clean.

Another aspect of the present invention is that is may be manufactured economically.

Another aspect of the present invention is that it may be made from readily available materials.

These and other features and advantages of the present invention will be presented in more detail in the following specification of the invention and the accompanying figures, which illustrate by way of example the principles of the invention.

There are additional features of the invention that will be described hereinafter and which will form the subject matter of the claims appended hereto. In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

BRIEF DESCRIPTION OF THE SEVERAL VIEWS OF THE DRAWINGS

The invention, together with further advantages thereof, may best be understood by reference to the following description taken in conjunction with the accompanying drawings in which.

DETAILED DESCRIPTION OF THE INVENTION

The present invention will now be described in detail with reference to a few preferred embodiments thereof as illustrated in the accompanying drawings. In the following description, numerous specific details are set forth in order to provide a thorough understanding of the present invention. It will be apparent, however, to one skilled in the art, that the present invention may be practiced without some or all of these specific details. In other instances, well known operations have not been described in detail so not to unnecessarily obscure the present invention.

Figure 1:
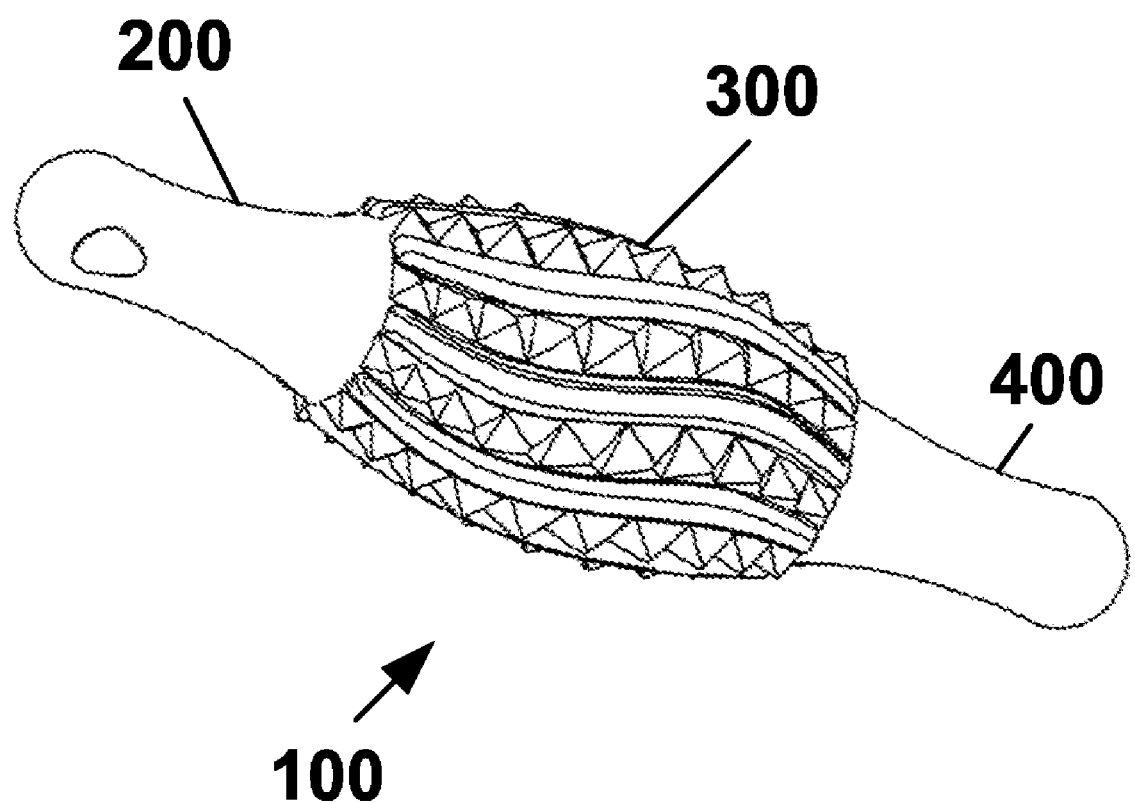
FIG. 1 illustrates a perspective view of a tenderizing device, according to an embodiment of the present invention.
Figure 2:
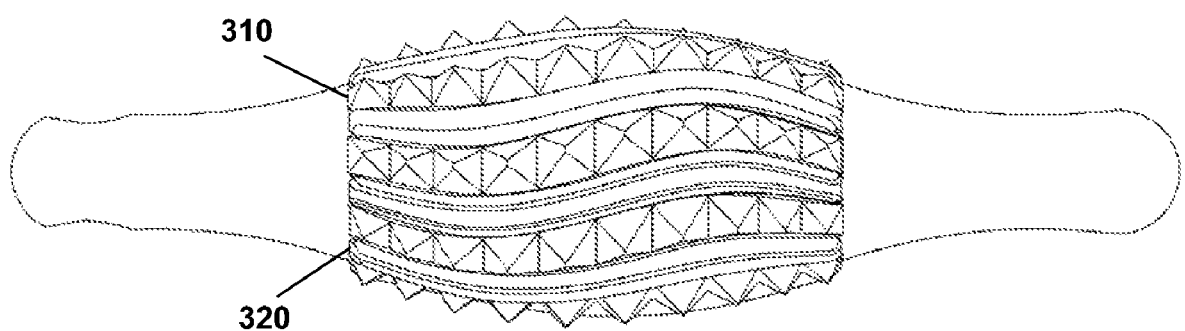
FIG. 2 illustrates a front plan view of a tenderizing device, according to an embodiment of the present invention.
Figure 3:
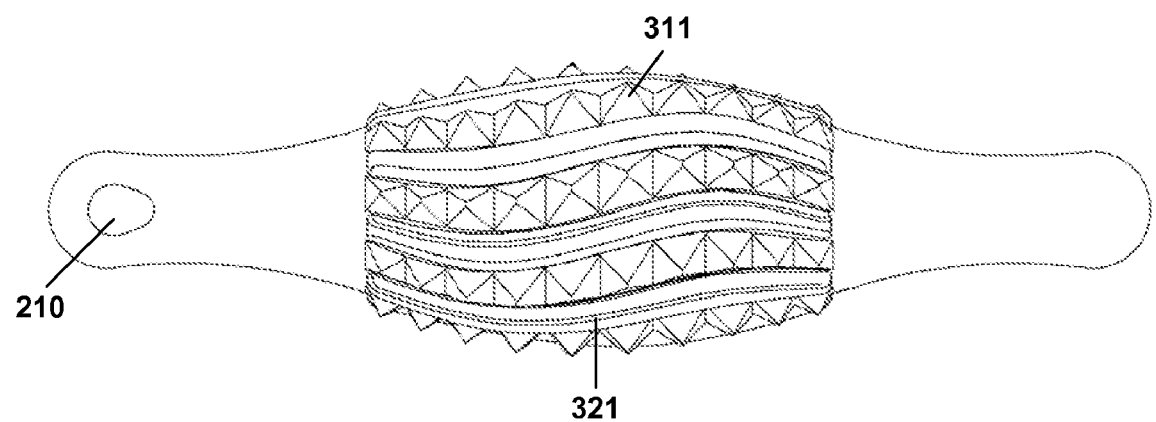
FIG. 3 illustrates a side plan view of a tenderizing device, according to an embodiment of the present invention.
Figure 4:
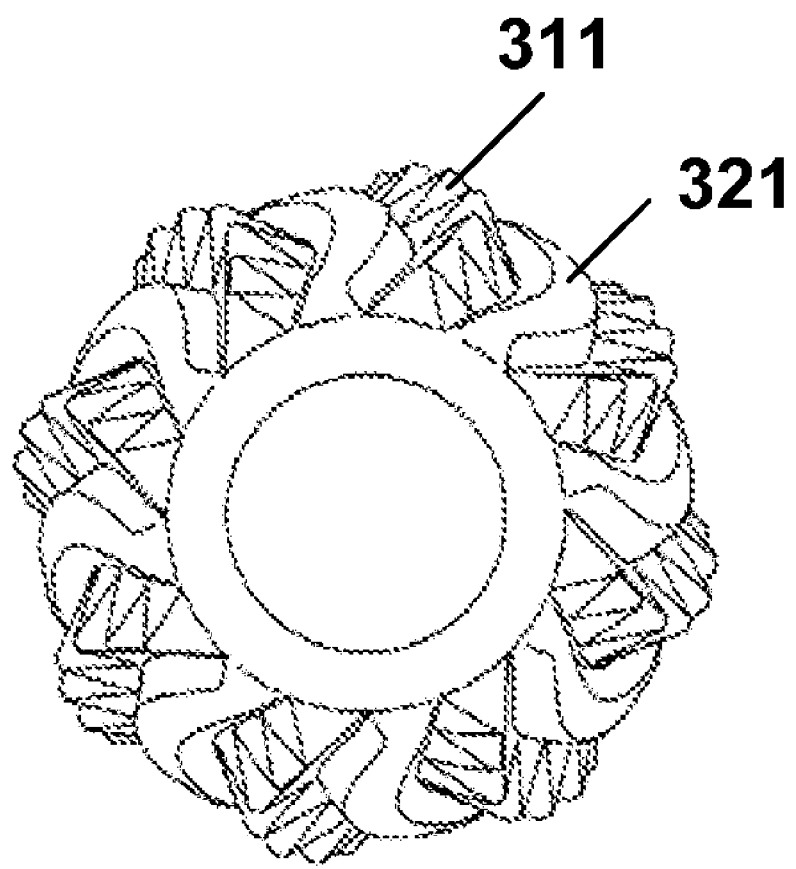
FIG. 4 illustrates a bottom plan view of a tenderizing device, according to an embodiment of the present invention.

Referring now to FIG. 1 through FIG. 4 an embodiment of a tenderizing device 100 is formed as one piece and comprised of a left-section portion 200, a mid-section portion 300 and a right-section portion 400. The mid-section portion 300 is comprised of a plurality of a tenderizing element 310 and a plurality of a flattening element 320. The tenderizing elements 310 and the flattening elements 320 are arranged in a non-linear fashion on the mid-section portion 300 and alternate with each other substantially as shown. The tendering elements 310 are comprised of an array of serrations 311. The serrations 311 vary in size with the largest serrations 311 positioned substantially in the central area of the mid-section portion 300 and incrementally decreasing in size as the array of serrations 311 progresses away from the central area of the mid-section portion 300. The flattening elements 320 are comprised of a flattening ridge 321. The left section portion 200 is further comprised of a hole 210, which may be used for hanging the tenderizing device 100 when not in use, or for inserting a merchandizing tag, or both. The tenderizing device 100 may be used in a horizontal position or at an angle, and the amount of pressure may be varied from light to heavy, from equal on the left section portion 200 and right section portion 400, or unequal, based on the type and degree of tenderizing and/or flattening desired for the target meat.

An embodiment of the present invention is made as follows.

Cut or burn a metal molding tool

Inject or compress a material to be molded into the metal molding tool

Ensure that the tool has two or more halves that create the handle portion and the surface feature portion Compress or inject suitable plastic or other material into the mold Cure the material The device is ready to use From the foregoing, it will be appreciated that, although specific embodiments of the invention have been described herein for purposes of illustration, various modifications may be made without deviating from the spirit and scope of the invention. For example, many of the features and components described above in the context of a particular tenderizing device configuration can be incorporated into other configurations in accordance with other embodiments of the invention. Accordingly, the invention is not limited except by the appended claims.

What is claimed is:

1. An apparatus for tenderizing and flattening meat comprising:
   a meat treating section having a plurality of a meat tenderizing element and a plurality of a meat flattening element,
   a left handle section, and
   a right handle section, wherein the meat treating section tapers down to meet the left handle section and the left handle section tapers up to meet the meat treating section, and the meat treating section tapers down to meet the right handle section and the right handle section tapers up to meet the meat treating section,
   wherein each meat tenderizing element and each meat flattening element is arranged in a non-linear fashion axially along the meat treating section.

2. The apparatus of claim 1, wherein each meat flattening element is further comprised of a ridge and each array of serrations is comprised of serrations of varying sizes.

3. The apparatus of claim 2, wherein the left handle section is formed with a hole.

4. The apparatus of claim 3, wherein the serrations have a pyramidal shape.

5. The apparatus of claim 4, wherein the serrations incrementally decrease in size from a mid-point of the meat treating section.

6. The apparatus of claim 5, wherein each meat flattening element alternates with each meat tenderizing element.

7. An apparatus for tenderizing and flattening meat comprising:
   a meat treating section having a plurality of meat tenderizing elements, a left handle section, and a right handle section, wherein the meat treating section tapers down to meet the left handle section and the left handle section tapers up to meet the meat treating section, and the meat treating section tapers down to meet the right handle section and the right handle section tapers up to meet the meat treating section,
   wherein the serrations consist of a plurality of varying sized pyramid shapes and are arranged in a non-linear fashion in at least one direction over the face the apparatus.

* * * * *